(12) United States Patent
Crepeau et al.

(10) Patent No.: US 8,417,365 B2
(45) Date of Patent: Apr. 9, 2013

(54) SYSTEMS AND METHODS FOR ENCODING AND DECODING COMPUTER-AIDED DESIGN FILES

(75) Inventors: Paul N. Crepeau, Clawson, MI (US);
Qigui Wang, Rochester Hills, MI (US)

(73) Assignee: GM Global Technology Operations LLC

( * ) Notice: Subject to any disclaimer, the term of this patent is extended or adjusted under 35 U.S.C. 154(b) by 420 days.

(21) Appl. No.: 12/760,894

(22) Filed: Apr. 15, 2010

(65) Prior Publication Data

US 2011/0257775 A1 Oct. 20, 2011

(51) Int. Cl.
*G06F 19/00* (2011.01)
(52) U.S. Cl. ............ 700/98; 703/8; 703/2; 703/5; 703/7; 703/1; 345/421; 345/428; 345/586; 345/619; 345/621; 345/646; 345/647; 345/440; 345/419; 726/26; 726/27; 726/21; 700/118; 700/197

(58) Field of Classification Search .................. 726/21
See application file for complete search history.

(56) References Cited

U.S. PATENT DOCUMENTS

| | | | |
|---|---|---|---|
| 6,870,546 B1 * | 3/2005 | Arsenault et al. | 345/619 |
| 2003/0080957 A1 * | 5/2003 | Stewart et al. | 345/420 |
| 2007/0196030 A1 * | 8/2007 | Grimaud et al. | 382/276 |

\* cited by examiner

*Primary Examiner* — Nathan Flynn
*Assistant Examiner* — Bryan Wright

(57) ABSTRACT

A system includes an encoding module and a decoding module. The encoding module generates a three-dimensional (3D) model of a part, modifies the 3D model to include a 3D structure, and generates a computer-aided design (CAD) file based on the modified 3D model. The decoding module determines whether the CAD file includes the 3D structure, authorizes operation of analysis software on the CAD file when the CAD file includes the 3D structure, and prohibits operation of the analysis software when the CAD file does not include the 3D structure.

18 Claims, 6 Drawing Sheets

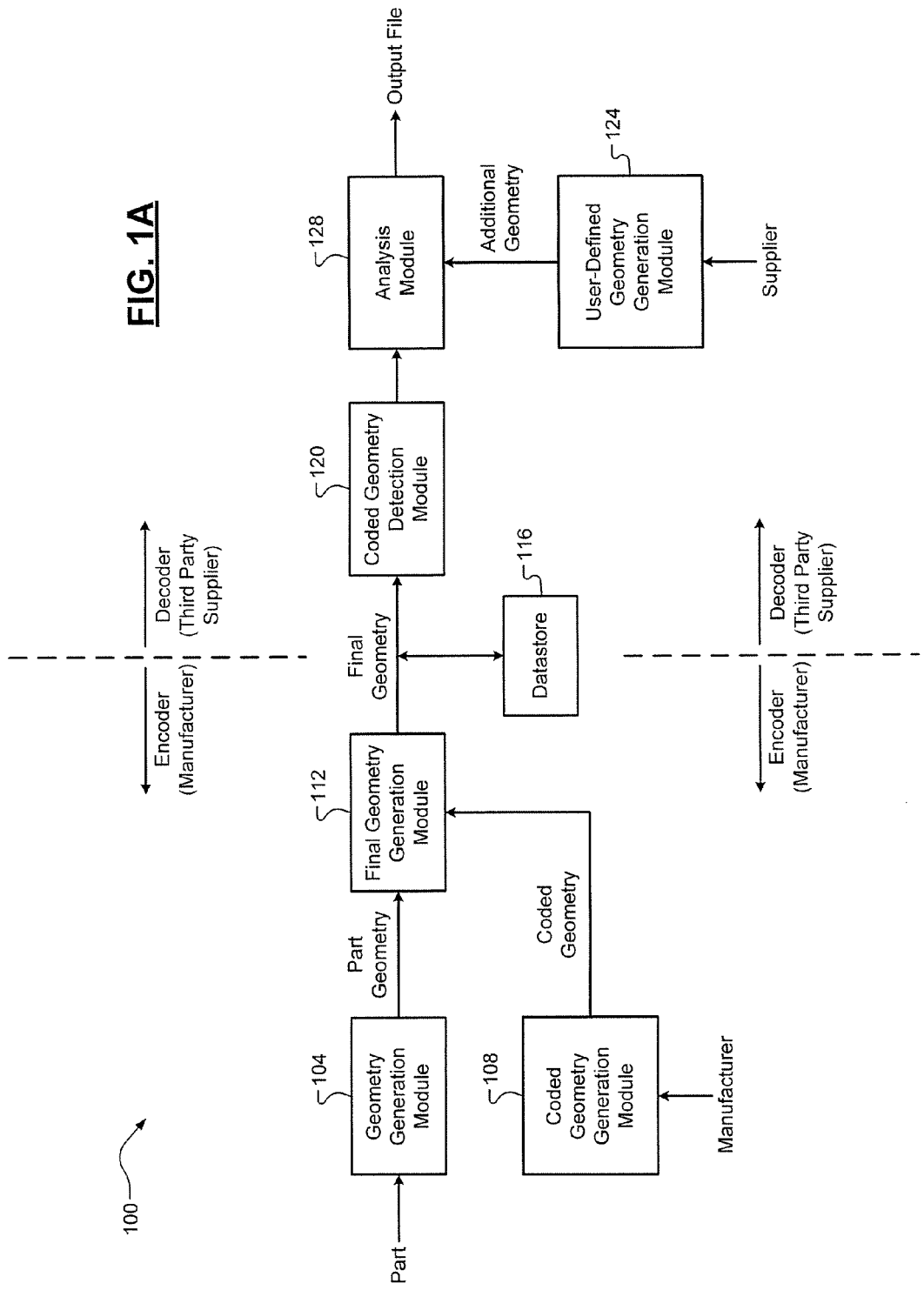

SYSTEMS AND METHODS FOR ENCODING AND DECODING COMPUTER-AIDED DESIGN FILES

FIELD

The present disclosure relates to software licenses, and more particularly to systems and methods for implementing a software license by encoding and decoding a computer-aided design (CAD) file.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Casting is a manufacturing process used for making parts having complex shapes that would be otherwise difficult or uneconomical to make by other methods. With respect to internal combustion engines, casting is used for making many metal parts ("metal casting"). Metal casting includes introducing liquid metal (e.g., aluminum, iron, etc.) into a mold that includes a hollow cavity of a desired shape. The liquid metal is then cooled until the metal solidifies, and the solidified metal is taken out of the mold resulting in the desired part.

Metal casting, however, may suffer from defects such as porosity due to solidification shrinkage and gas partition from the liquid metal. Porosity refers to voids being formed within the metal part as it cools and solidifies. Porosity may increase the probability of the part breaking. Solidification shrinkage refers to uncompensated contraction of the metal as it solidifies, changing from a liquid to a less dense solid. Therefore, in order to fill out the mold cavity during solidification, typical molds include mold components such as gating, runners, and/or risers that are filled with reservoirs of liquid metal to compensate for solidification contraction.

SUMMARY

A system includes an encoding module and a decoding module. The encoding module generates a three-dimensional (3D) model of a part, modifies the 3D model to include a 3D structure, and generates a computer-aided design (CAD) file based on the modified 3D model. The decoding module determines whether the CAD file includes the 3D structure, authorizes operation of analysis software on the CAD file when the CAD file includes the 3D structure, and prohibits operation of the analysis software when the CAD file does not include the 3D structure.

A method includes generating a three-dimensional (3D) model of a part, modifying the 3D model to include a 3D structure, generating a computer-aided design (CAD) file based on the modified 3D model, determining whether the CAD file includes the 3D structure, authorizing operation of analysis software on the CAD file when the CAD file includes the 3D structure, and prohibiting operation of the analysis software on the CAD file when the CAD file does not include the 3D structure.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a functional block diagram of a first exemplary embodiment of an encoding and decoding system according to the present disclosure;

DETAILED DESCRIPTION

Figure 1B:
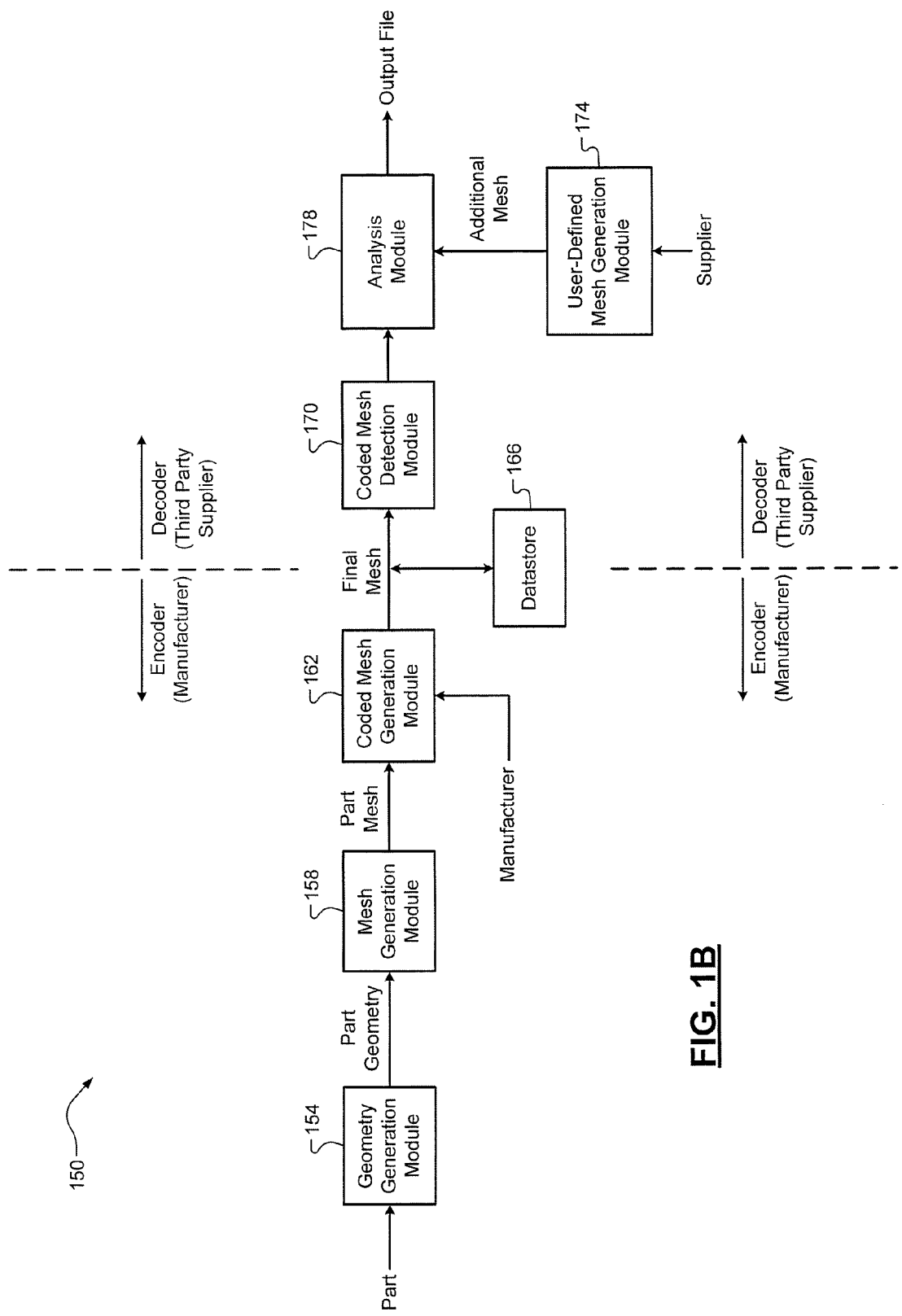
FIG. 1B is a functional block diagram of a second exemplary embodiment of the encoding and decoding system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Manufacturers of internal combustion engines have developed software to predict casting defects in metal parts. For example, casting defects may include gas porosity and/or solidification shrinkage. The software may model the mold and the casting process and analyze the model to predict casting defects. More specifically, the software may perform finite element analysis (FEA) of the model to predict casting defects. For example, the FEA may include predicting temperature and/or flow at different locations of the mold and at different times during the casting process.

When the predicted casting defects are too severe (e.g., outside of a tolerance), the manufacturer may either modify the design of the part or modify the mold components used in the casting process. Modifying the mold components used in the casting process may be more cost-effective than changing the design of the part, and thus may be more desirable.

Typical manufacturers may outsource the casting of parts to third party suppliers (e.g., a foundry). In other words, manufacturers may send a CAD part file (i.e., a design part file) to the supplier, and the supplier may then create the mold for the casting process using the CAD part file. Additionally or alternatively, the manufacturer may generate a mesh file based on the CAD part file and send the mesh file to the supplier for use in creating a larger mesh file that includes the mold components.

Typical suppliers, however, may not disclose the specifics of their molding and casting processes. For example, a supplier may not disclose details about mold components such as the size and orientation of the risers used in the casting process. Therefore, a manufacturer may allow the supplier to use the manufacturer's proprietary analysis software on the mold (i.e., part plus mold components) to predict defects and subsequently modify the mold components to compensate for severe predicted defects. The manufacturer, however, may not want to provide the supplier with an unrestricted ("freeware") version of the software. In other words, the manufacturer may want to implement a license to limit the use of the software to molding and casting for its own parts (i.e., not for use with competitors).

Accordingly, systems and methods are presented for encoding and decoding design files to prevent unauthorized usage of proprietary FEA software. For example, the design files may include CAD geometry files and/or CAD mesh files. More specifically, the systems and methods provide for encoding of the CAD files by the manufacturer and for decoding of the CAD files by the manufacturer's FEA software (run by the supplier) in determining whether the FEA software is authorized to run. For example, the encoding of the CAD file may include modifying the three-dimensional (3D) structure of the part in the CAD file to include a unique 3D structure. The CAD file, however, may also be encoded by adding a different type of unique marking.

In other words, the encoding of the CAD file includes adding a "code feature" (i.e., the unique 3D structure) to identify that the part is from the manufacturer and thus the software is authorized to run. More specifically, the software may determine whether the mold (i.e., the part cavity plus additional mold features, such as risers) includes the code feature. If the FEA software detects the code feature, the FEA software may run. If that FEA software fails to detect the code feature, however, the FEA may not run (e.g., an error or unauthorized message).

Referring now to FIG. 1A, a first exemplary embodiment of the system according to the present disclosure is shown. An encoding and decoding system 100 (hereinafter referred to as "system 100") includes a plurality of modules. Each of the plurality of modules may be located at one of an encoder end (i.e., the manufacturer that created the part and is outsourcing the casting) and a decoder end (i.e., the third party supplier to create the mold and cast the parts for the manufacturer).

At the encoder end, the system 100 includes a geometry generation module 104, a coded geometry generation module 108, and a final geometry generation module 112. For example, the modules located at the encoder end may be collectively referred to as "an encoding module." The geometry generation module 104 generates a geometry for the part to be cast. For example, the geometry generation module 104 may include CAD software that creates the geometry of the part.

The coded geometry generation module 108 generates a geometry for the coded feature to be added to the part geometry. For example, the coded geometry generation module 108 may also include CAD software that creates the geometry of the coded feature. The coded feature may be either created by a user at the manufacturer end or may be selected from a predetermined set of code features (e.g., in a look-up table).

The final geometry generation module 112 receives the part geometry and the coded geometry from the geometry generation module 104 and the coded geometry generation module 108, respectively. The final geometry generation module 112 generates a final geometry for the part to be cast using the part geometry and the coded geometry. In other words, the final geometry generation module 112 may insert or assemble the coded geometry into the part geometry. For example, the final geometry generation module 112 may also include CAD software that inserts or assembles the coded geometry into the part geometry.

For example, the coded feature (detailed by the coded geometry) may be placed on a surface not to be machined during manufacturing. Additionally or alternatively, for example, the coded feature may be placed on a surface not to be deleted or covered after the addition of additional molding features by the third party supplier (e.g., risers). In other words, the manufacturer may insert or assemble the coded feature in a location so that it may not be modified during molding and casting in order to maintain the integrity of the license and allow the FEA software to run.

Figure 3A:
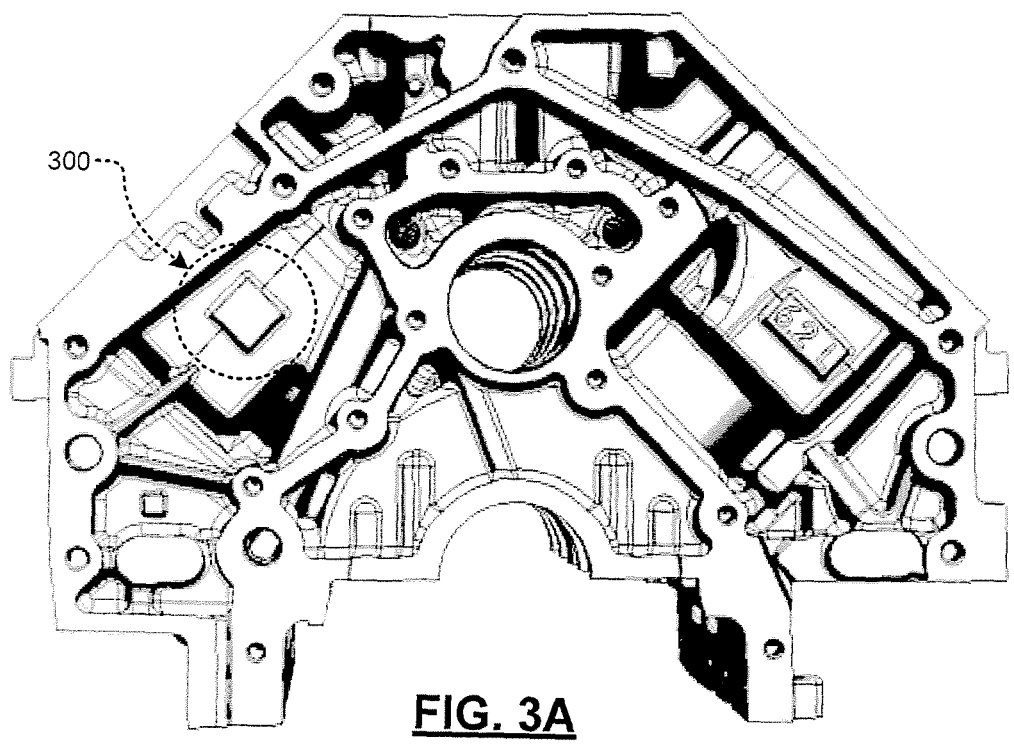
FIGS. 3A and 3B are exemplary part geometries with and without encoding according to the present disclosure.
Figure 3B:
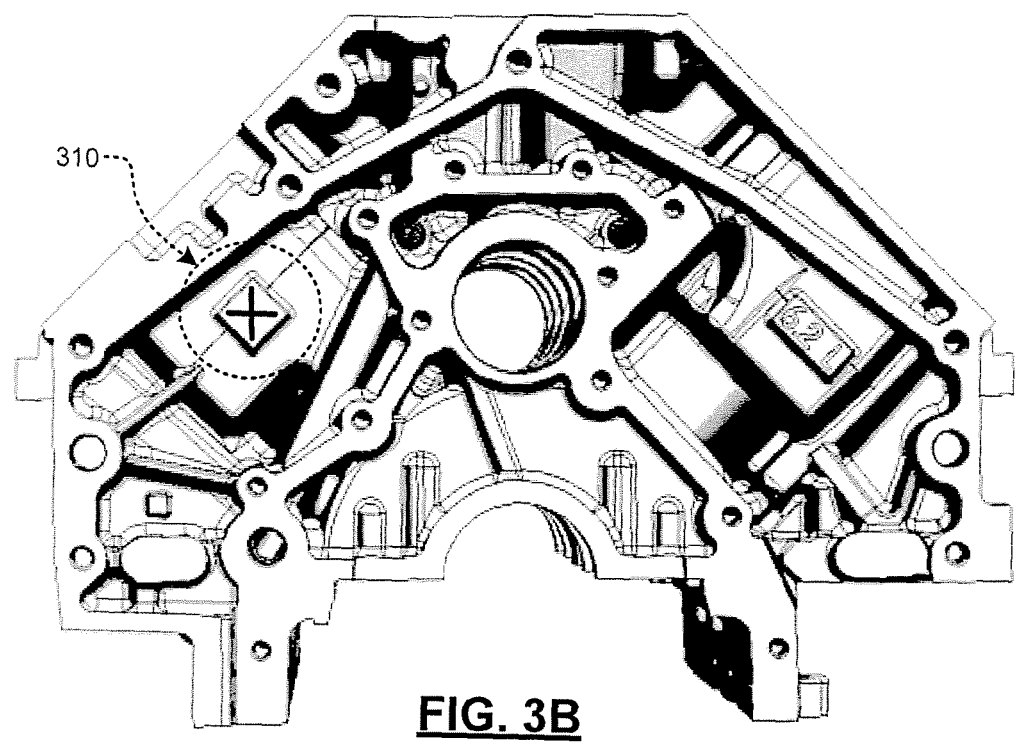

Referring now to FIGS. 3A and 3B, part geometries with and without a coded feature are shown. FIG. 3A illustrates a part geometry without a coded feature. Region 300, however, refers to a location to insert a coded feature. FIG. 3B illustrates the same part geometry as FIG. 3A with a coded feature. More specifically, region 310 refers to the same location as region 300 of FIG. 3A, but with a coded feature (denoted by an "X").

Referring again to FIG. 1A, the third party supplier receives the final geometry from the manufacturer (generated by the final geometry generation module 112). Additionally or alternatively, the final geometry may be stored in a datastore 116 that is accessible by both the manufacturer and the third party supplier. For example, the datastore 116 may be a server where the final geometry may be uploaded by the manufacturer and downloaded by the third party supplier.

At the decoder end, the system 100 includes a coded geometry detection module 120, a user-defined geometry generation module 124, and an analysis module 128. For example, the modules located at the decoder end may be collectively referred to as "a decoding module." The coded geometry detection module 120 receives the final geometry and detects whether the coded feature is present. For example, the coded geometry detection module 120 may also include CAD software that scans the final geometry for the coded geometry. The coded geometry detection module 120 may detect whether a particular coded feature is present or whether one of a plurality of coded features is present. For example, the plurality of coded features may be stored in a look-up table as described with reference to the coded geometry generation module 108. The coded geometry detection module 120 may then output a signal ("a detection signal") to the analysis module 128 indicating whether or not the coded feature was detected. Additionally, the coded geometry detection module 120 may send the final geometry to the analysis module 128 (i.e., along with the detection signal).

The user-defined geometry generation module 124 generates additional geometry to be analyzed along with the final geometry. More specifically, the additional geometry may include additional features (e.g., risers) used during the molding and casting process. The additional features may be either created by a user at the third party supplier end or may be selected from a predetermined set of additional features (e.g., in a look-up table). For example, the user-defined geometry generation module 124 may also include CAD software that generates the additional geometry.

The analysis module 128 receives the final geometry, the additional geometry, and the detection signal indicating whether the final geometry includes the coded feature. When the detection signal indicates that the final geometry includes the coded feature (i.e., a first state of the detection signal), the analysis module 128 may generate an output file. For example, the analysis module 128 may include the proprietary FEA software for generating the output file. In other words, the analysis module 128 may generate an output file that includes results of the FEA software on the combination of the final geometry and the additional geometry. However, when the detection signal indicates that the final geometry does not include the coded feature (i.e., a second state of the detection signal), the analysis module 128 may not generate an output file. In other words, the proprietary FEA software may not run. For example, the analysis module 128 may generate an error message or an unauthorized message notifying the third party supplier that the part corresponding to the final geometry was not created by the manufacturer.

Referring now to FIG. 1B, a second exemplary embodiment of the system according to the present disclosure is shown. An encoding and decoding system 150 (hereinafter referred to as "system 150") includes a plurality of modules. Each of the plurality of modules may be located at one of an encoder end (i.e., the manufacturer that created the part and is outsourcing the casting) and a decoder end (i.e., the third party supplier to create the mold and cast the parts for the manufacturer).

The system 150 is similar to the system 100 (described above and depicted in FIG. 1A). The system 150, however, includes the generation of part and code meshes rather than geometries. In other words, the manufacturer may generate a part mesh, insert a coded mesh (i.e., a coded feature) to create a final mesh, and the third party supplier may detect the coded feature in the final mesh before being allowed to run the proprietary FEA software on the combination of the final mesh and additional mesh features corresponding to the molding and casting process.

More specifically, the encoder end includes a geometry generation module 154, a mesh generation module 158, and a coded mesh generation module 162. The geometry generation module 154 operates the same was as geometry generation module 104 (see above and FIG. 1A). The geometry generation module 154 generates a geometry of the part to be molded and cast by the third party supplier.

The mesh generation module 158 receives the part geometry and generates a part mesh based on the part geometry. For example, the mesh generation module 158 may also include CAD software to generate the part mesh. The coded mesh generation module 162 receives the part mesh and generates a final mesh based on the part mesh. More specifically, the coded mesh generation module 162 may insert a coded mesh (i.e., a coded feature) into the part mesh. In other words, the coded mesh generation module 162 may modify the 3D structure of the part mesh to insert the coded feature. For example, the coded mesh generation module 162 may also include CAD software to insert the coded feature and generate the final mesh. The process of selecting a location and/or surface to insert the coded feature may be the same as described above with reference to FIG. 1A.

Figure 4A:
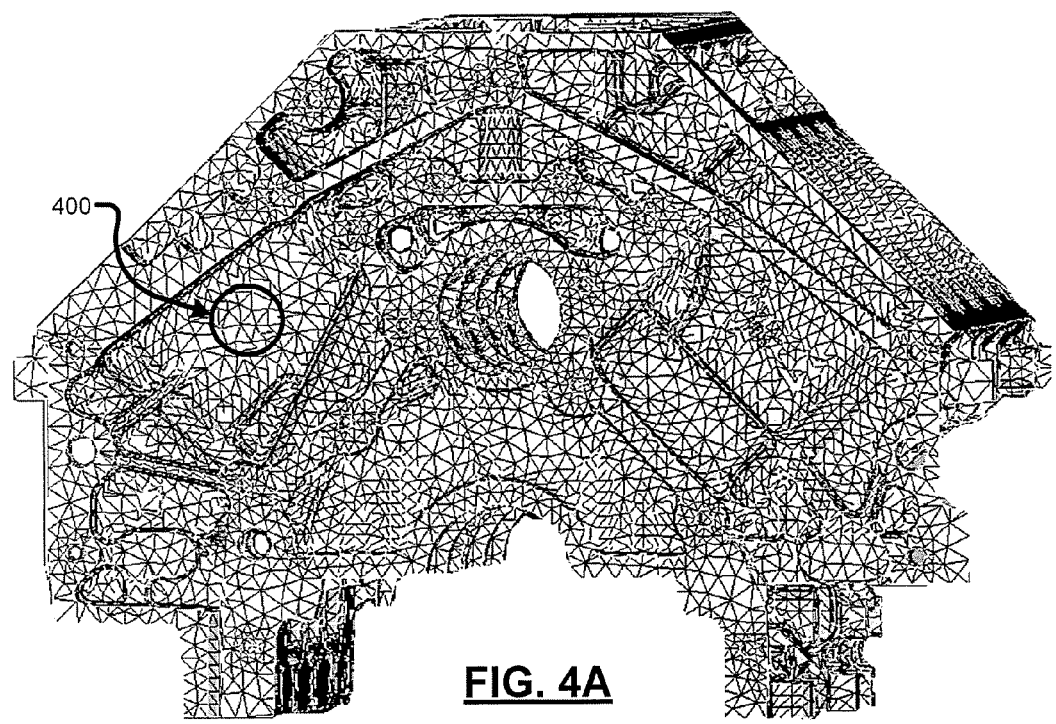
FIGS. 4A and 4B are two views of an exemplary part mesh with encoding according to the present disclosure.
Figure 4B:
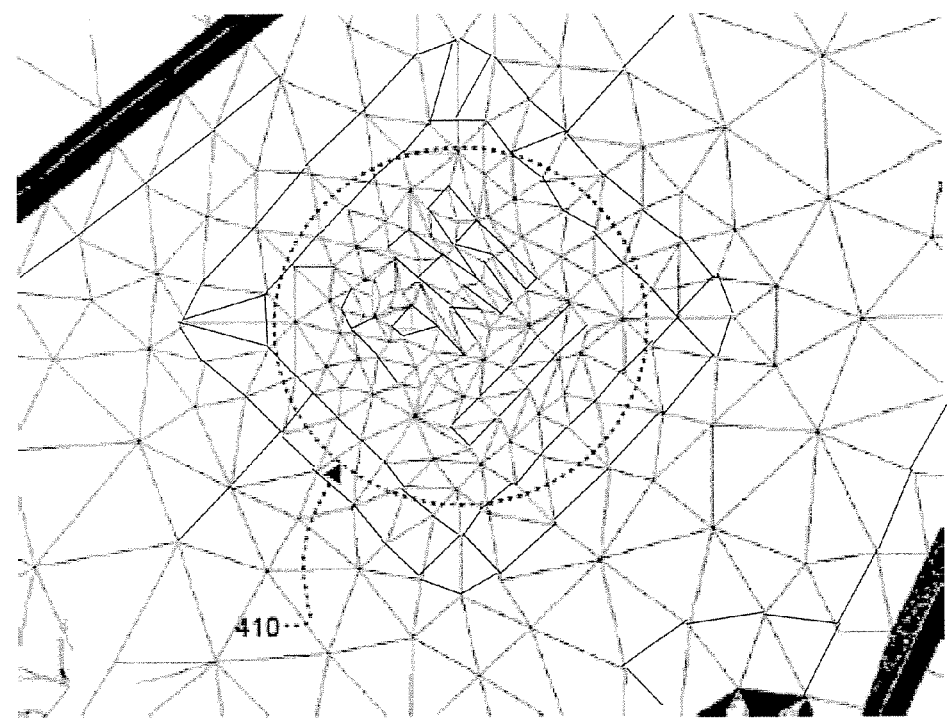

Referring now to FIGS. 4A and 4B, two views of a part mesh with a coded feature are shown. FIG. 4A illustrates a part mesh with a coded feature referenced by region 400. FIG. 4B illustrates a magnified view of the same part mesh as FIG. 4B to more accurately depict the coded feature referenced by region 410. As shown, the 3D structure of the part mesh has been modified in region 410 to include the coded feature.

Referring again to FIG. 1B, the third party supplier receives the final mesh from the manufacturer (generated by the coded mesh generation module 162). Additionally or alternatively, the final mesh may be stored in a datastore 166 that is accessible by both the manufacturer and the third party supplier. For example, the datastore 166 may be a server where the final mesh may be uploaded by the manufacturer and downloaded by the third party supplier.

At the decoder end, the system 150 includes a coded mesh detection module 170, a user-defined mesh generation module 174, and an analysis module 178. The coded mesh detection module 170 receives the final mesh and detects whether the coded feature is present. For example, the coded mesh detection module 170 may also include CAD software that scans the final mesh for the coded mesh. The coded mesh detection module 170 may detect whether a particular coded feature is present or whether one of a plurality of coded features is present. For example, the plurality of coded features may be stored in a look-up table as described with reference to the coded mesh generation module 158. The coded mesh detection module 170 may then output a signal ("a detection signal") to the analysis module 178 indicating whether or not the coded feature was detected. Additionally, the coded mesh detection module 170 may send the final mesh to the analysis module 178 (i.e., along with the detection signal).

The user-defined mesh generation module 174 generates additional mesh to be analyzed along with the final mesh. More specifically, the additional mesh may include additional features (e.g., risers) used during the molding and casting process. The additional features may be either created by a user at the third party supplier end or may be selected from a predetermined set of additional features (e.g., in a look-up table). For example, the user-defined mesh generation module 174 may also include CAD software that generates the additional mesh.

The analysis module 178 receives the final mesh, the additional mesh, and the detection signal indicating whether the final mesh includes the coded feature. When the detection signal indicates that the final mesh includes the coded feature (i.e., a first state of the detection signal), the analysis module 178 may generate an output file. For example, the analysis module 178 may include the proprietary FEA software for generating the output file. In other words, the analysis module 178 may generate an output file that includes results of the FEA software on the combination of the final mesh and the additional mesh. However, when the detection signal indicates that the final mesh does not include the coded feature (i.e., a second state of the detection signal), the analysis module 178 may not generate an output file. In other words, the proprietary FEA software may not run. For example, the analysis module 178 may generate an error message or an unauthorized message notifying the third party supplier that the part corresponding to the final mesh was not created by the manufacturer.

Figure 2A:
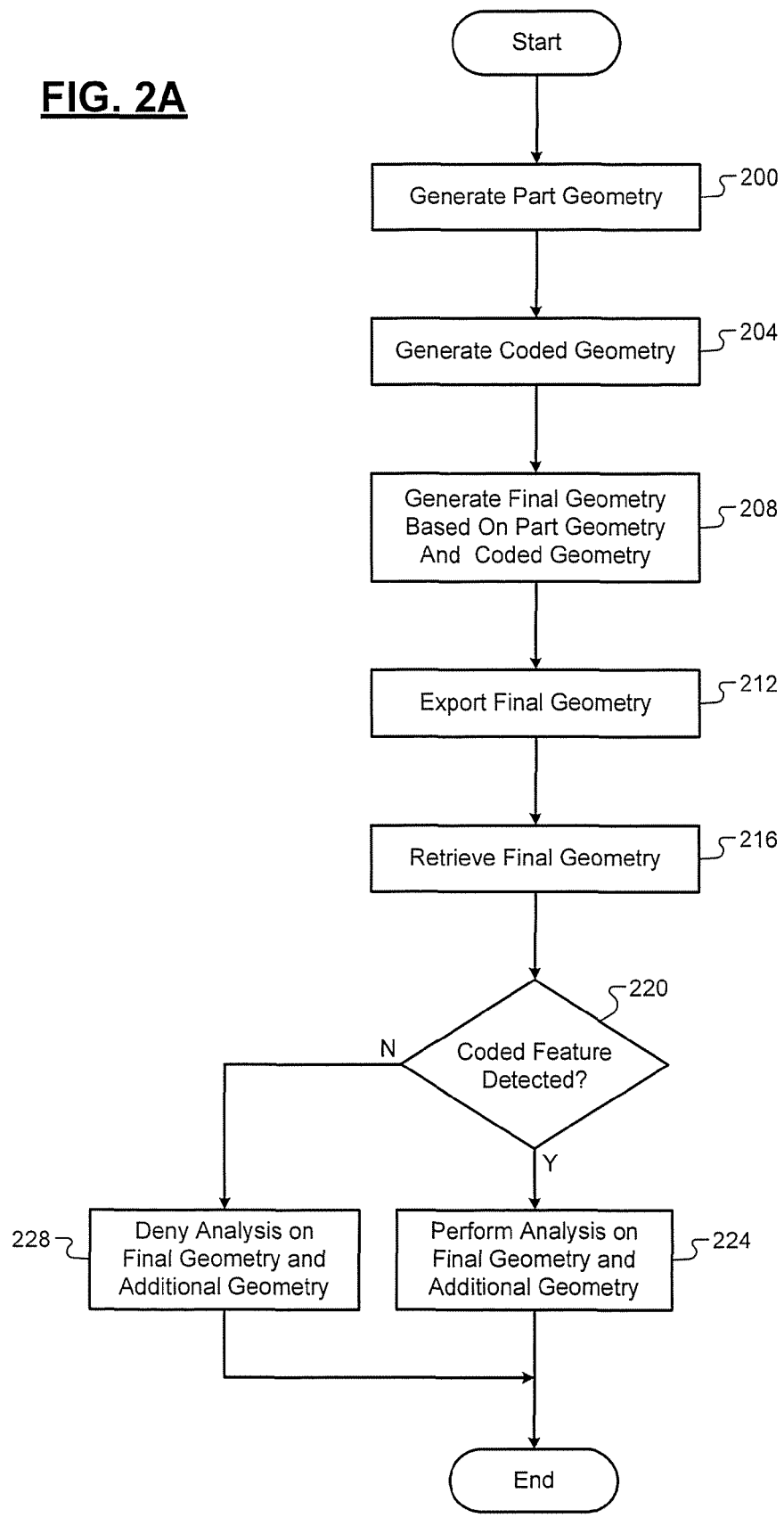
FIG. 2A is a flow diagram of a first exemplary method for encoding and decoding a computer-aided design (CAD) file according to the present disclosure.

Referring now to FIG. 2A, a first exemplary method of encoding and decoding part design files according to the present disclosure begins at 200. For example, the first exemplary method may correspond to system 100. At 200, the system 100 may generate the part geometry. At 204, the system 100 may generate the coded geometry (i.e., the coded feature).

At 208, the system 100 may generate the final geometry based on the part geometry and the coded geometry. At 212, the system 100 (i.e., via the manufacturer) may export the final geometry (e.g., to datastore 116). At 216, the system 100 (i.e., via the third party supplier) may retrieve the final geometry (e.g., from datastore 116).

At 220, the system 100 may detect whether the coded feature is present in the final geometry. If true, control may proceed to 224. If false, control may proceed to 228. At 224, the system 100 may run the proprietary FEA software on the combination of the final geometry and additional geometry corresponding to the molding and casting process. The system 100 may also generate an output file that includes the results of the FEA software. Control may then return to 200.

At 228, the system 100 may not run the proprietary FEA software on the combination of the final geometry and the additional geometry corresponding to the molding and casting process. In other words, the part associated with the final geometry is not made by the manufacturer. The system 100 may also generate an error message or an unauthorized message for the third party supplier. Control may then return to 200.

Figure 2B:
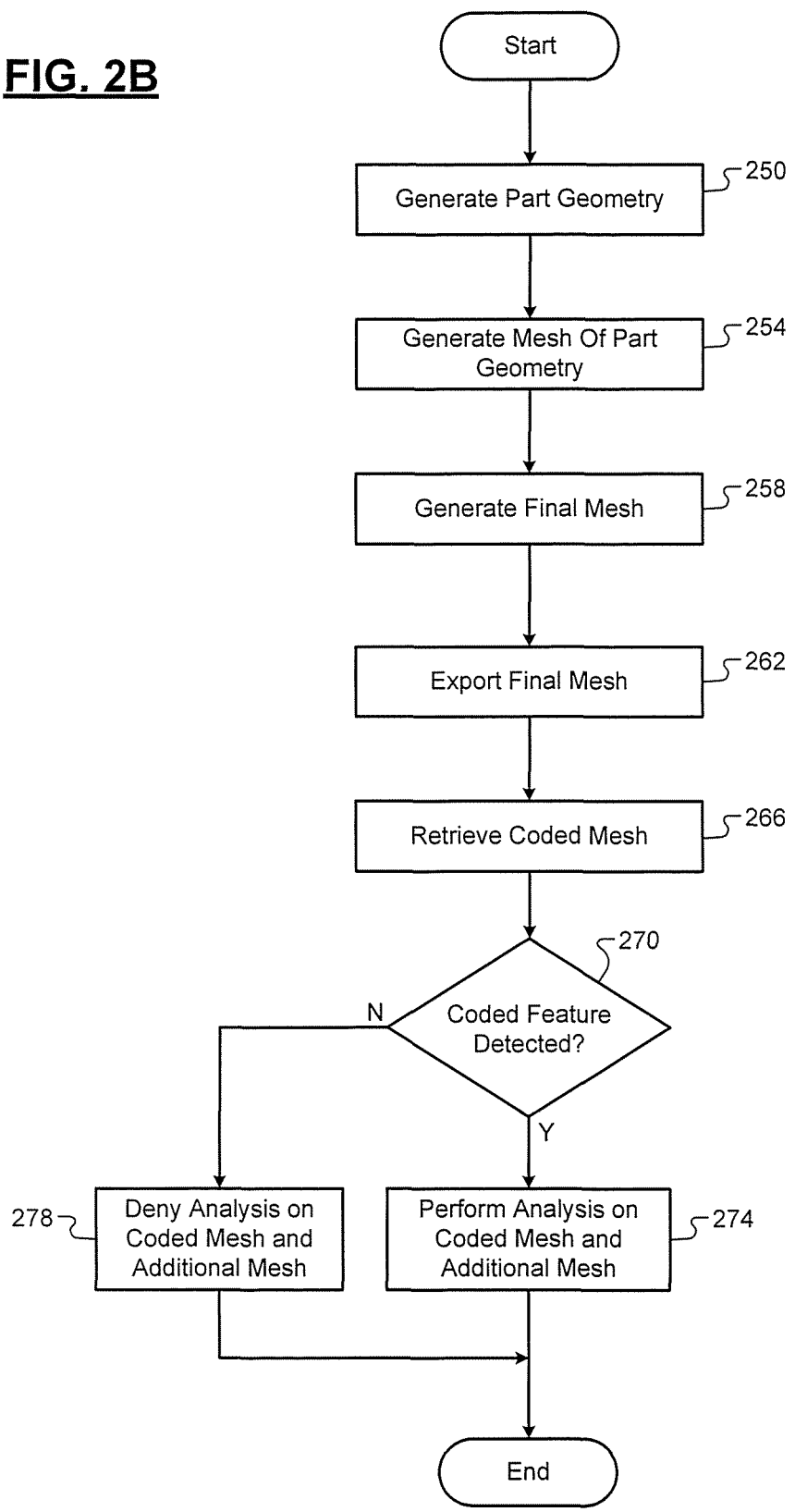
FIG. 2B is a flow diagram of a second exemplary method for encoding and decoding a CAD file according to the present disclosure.

Referring now to FIG. 2B, a second exemplary method of encoding and decoding part design files according to the present disclosure begins at 250. For example, the second exemplary method may correspond to system 150. At 250, the system 150 may generate the part geometry. At 254, the system 150 may generate the part mesh based on the part geometry.

At 258, the system 150 may generate the final mesh based on the part mesh and the coded mesh (i.e., the coded feature). At 262, the system 150 (i.e., via the manufacturer) may export the final mesh (e.g., to datastore 166). At 266, the system 150 (i.e., via the third party supplier) may retrieve the final mesh (e.g., from datastore 166).

At 270, the system 150 may detect whether the coded feature is present in the final mesh. If true, control may proceed to 274. If false, control may proceed to 278. At 274, the system 150 may run the proprietary FEA software on the combination of the final mesh and additional mesh corresponding to the molding and casting process. The system 150 may also generate an output file that includes the results of the FEA software. Control may then return to 250.

At 278, the system 150 may not run the proprietary FEA software on the combination of the final mesh and the additional mesh corresponding to the molding and casting process. In other words, the part associated with the final mesh is not made by the manufacturer. The system 150 may also generate an error message or an unauthorized message for the third party supplier. Control may then return to 250.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system, comprising:
an encoding module that generates a three-dimensional (3D) model of a part, that modifies the 3D model to include a 3D structure, and that generates a computer-aided design (CAD) file based on the modified 3D model; and
a decoding module that determines whether the CAD file includes the 3D structure, that authorizes operation of analysis software on the CAD file when the CAD file includes the 3D structure, and that prohibits operation of the analysis software when the CAD file does not include the 3D structure,
wherein the decoding module modifies the CAD file by adding molding features relating to a casting process during a period before authorizing operation of the analysis software on the CAD file, and executes the analysis software on the modified CAD file, wherein the analysis software includes finite element analysis (FEA) of at least one of temperature and flow of liquid metal during the casting process.

2. The system of claim 1, wherein the decoding module modifies one of the 3D model of the part and the molding features based on results of the analysis software.

3. The system of claim 1, wherein the decoding module generates one of an error message and an unauthorized message when operation of the analysis software is prohibited.

4. The system of claim 1, wherein the CAD file includes mesh geometry.

5. The system of claim 1, wherein the 3D structure is one of generated by a user and selected from a predetermined set of 3D structures.

6. The system of claim 1, wherein the encoding module is controlled by a first entity.

7. The system of claim 6, wherein the first entity owns the analysis software and manufactures a product that includes a cast part made by a second entity.

8. The system of claim 7, wherein the decoding module is controlled by the second entity.

9. The system of claim 8, wherein the second entity creates a mold for the part and casts the part.

10. A method, comprising:
generating a three-dimensional (3D) model of a part;
modifying the 3D model to include a 3D structure;
generating a computer-aided design (CAD) file based on the modified 3D model;
determining whether the CAD file includes the 3D structure;
authorizing operation of analysis software on the CAD file when the CAD file includes the 3D structure;
prohibiting operation of the analysis software on the CAD file when the CAD file does not include the 3D structure;
modifying the CAD file by adding molding features relating to a casting process during a period before authorizing the operation of the analysis software on the CAD file; and
executing the analysis software on the modified CAD file, wherein the analysis software includes finite element analysis (FEA) of at least one of temperature and flow of liquid metal during the casting process.

11. The method of claim 10, further comprising:
modifying one of the 3D model of the part and the molding features based on results of the analysis software.

12. The method of claim 10, wherein the prohibiting the operation of the analysis software further includes generating one of an error message and an unauthorized message.

13. The method of claim 10, wherein the CAD file includes mesh geometry.

14. The method of claim 10, wherein the 3D structure is one of generated by a user and selected from a predetermined set of 3D structures.

15. The method of claim 10, wherein the generating the 3D model of the part, the modifying the 3D model to include the 3D structure, and the generating the CAD file based on the modified 3D model are each performed by a first entity.

16. The method of claim 15, wherein the first entity owns the analysis software and manufactures a product that includes a cast part made by a second entity.

17. The method of claim 16, wherein the determining whether the CAD file includes the 3D structure and the authorizing the operation of analysis software on the CAD file are each performed by the second entity.

18. The method of claim 17, wherein the second entity creates a mold for the part and casts the part.

* * * * *